(12) United States Patent
Fujimoto et al.

(10) Patent No.: US 8,797,641 B2
(45) Date of Patent: Aug. 5, 2014

(54) PULSE-WIDTH CONVERTING APPARATUS AND OPTICAL AMPLIFYING SYSTEM

(75) Inventors: Masatoshi Fujimoto, Hamamatsu (JP); Yoichi Kawada, Hamamatsu (JP); Kodai Fukazawa, Hamamastsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 168 days.

(21) Appl. No.: 13/390,746
(22) PCT Filed: Jul. 8, 2010
(86) PCT No.: PCT/JP2010/061627
§ 371 (c)(1), (2), (4) Date: Feb. 16, 2012
(87) PCT Pub. No.: WO2011/027617
PCT Pub. Date: Mar. 10, 2011

(65) Prior Publication Data
US 2012/0147457 A1 Jun. 14, 2012

(30) Foreign Application Priority Data
Sep. 1, 2009 (JP) ................................. 2009-201929

(51) Int. Cl.
*H01S 3/10* (2006.01)
(52) U.S. Cl.
USPC ............................................ 359/337; 372/30
(58) Field of Classification Search
USPC ............................... 372/102, 30; 359/333, 337
See application file for complete search history.

(56) References Cited
U.S. PATENT DOCUMENTS
3,549,239 A 12/1970 Brienza et al.
4,928,316 A 5/1990 Heritage et al.
(Continued)

FOREIGN PATENT DOCUMENTS
CN 101490914 7/2009
EP 1220478 A2 * 7/2002
(Continued)

OTHER PUBLICATIONS
X. Zhou, et al., "Generation of 28-fs pulses from a mode-locked ytterbium fiber oscillator", May 12, 2008, Optics Express, vol. 16, No. 10, p. 7055-7059.

*Primary Examiner* — Mark Hellner
(74) *Attorney, Agent, or Firm* — Drinker Biddle & Reath LLP

(57) ABSTRACT

An input light pulse Pi, input at a constant incident angle to a transmission-type diffraction grating 20, is dispersed according to the wavelengths to be output at output angles according to the wavelengths, to be reflected by reflecting mirrors 41, 42, and 43 in series, and thereafter, the light rays are input at incident angles according to their wavelengths to the transmission-type diffraction grating 20, to be output at a constant output angle from the transmission-type diffraction grating 20. The optical path for the light rays of respective wavelength components, output at the constant output angle from the transmission-type diffraction grating 20, is folded back by a rectangular prism 40, to be input at a constant incident angle to the transmission-type diffraction grating 20, and the light rays are output at output angles according to their wavelengths, to be reflected by the reflecting mirrors 43, 42, and 41 in series, and are thereafter input at incident angles according to their wavelengths to the transmission-type diffraction grating 20. The light rays, input at the incident angles according to their wavelengths to the transmission-type diffraction grating 20, are coupled by the transmission-type diffraction grating 20, to be output as an output light pulse Po. Thereby, realizing the pulse width conversion device and the optical amplifier system, which are easily downsized.

9 Claims, 15 Drawing Sheets

(56) References Cited

U.S. PATENT DOCUMENTS

| | | | |
|---|---|---|---|
| 5,329,398 A | 7/1994 | Lai et al. | |
| 5,995,281 A | 11/1999 | Simon et al. | |
| 6,081,543 A * | 6/2000 | Liu et al. | 372/102 |
| 6,272,156 B1 | 8/2001 | Reed et al. | |
| 2006/0285561 A1 | 12/2006 | Shah et al. | |

FOREIGN PATENT DOCUMENTS

| | | | |
|---|---|---|---|
| JP | S47-042346 | | 10/1972 |
| JP | H3-503233 | | 7/1991 |
| JP | H9-508217 | | 8/1997 |
| JP | 11-218490 | | 8/1999 |
| JP | 2002-502061 | | 1/2002 |
| JP | 02002252401 A | * | 9/2002 |
| JP | 2004-071583 | | 3/2004 |
| JP | 2007-109962 | | 4/2007 |
| JP | 2007-317708 | | 12/2007 |
| JP | 2008-021798 | | 1/2008 |
| JP | 2008-518488 | | 5/2008 |
| WO | 01/05003 | | 1/2001 |

* cited by examiner

PULSE-WIDTH CONVERTING APPARATUS AND OPTICAL AMPLIFYING SYSTEM

TECHNICAL FIELD

The present invention relates to a pulse width conversion device that produces an output light pulse with a pulse width different from a pulse width of an input light pulse, and to an optical amplifier system including an optical amplifier device and a pulse width conversion device.

BACKGROUND ART

In order to stably operate a high-intensity ultrashort pulse laser device, as disclosed in Non-Patent Document 1, it is important that a pulse width of a light pulse is expanded to a chirped pulse by a pulse width conversion device (pulse expanding device) before optical amplification, an instantaneous intensity of the light pulse is suppressed to a low level in an optical amplifier device, and the pulse width of the light pulse is compressed by the pulse width conversion device (pulse compressing device) after the optical amplification, to increase a peak value of the light pulse. Such a method is called a chirped pulse amplification method.

A chirped pulse is a light pulse having a property in which an arrival time differs according to each of wavelength components included in the light pulse. The lower limit of the pulse width of the light pulse is determined according to a bandwidth of a wavelength band composing the light pulse. This is called Fourier-transform-limited pulse width. A pulse width of a chirped pulse is longer than the Fourier-limited pulse width. However, a chirped pulse is caused to pass through a device in which optical path lengths of the respective wavelength components composing the pulse are adjusted to be predetermined lengths, to be able to compress its pulse width into approximately the Fourier-limited pulse width.

The pulse compressing device is generally a device which is capable of compressing the above-described chirped pulse into approximately the Fourier-transform-limited pulse width. By arranging the pulse compressing device at the final stage of the high-intensity ultrashort pulse laser device, it is possible to compress a pulse width of a high-energy chirped pulse which has been amplified, to make the pulse width as short as possible, which makes it possible to increase a peak value of the light pulse. Here, depending on adjustment, it is possible to output a light pulse with a time width longer than the Fourier-transform-limited pulse width.

On the other hand, such a pulse compressing device is capable of operating as a pulse expanding device that expands a pulse width of a light pulse to a chirped pulse. Such a pulse width conversion device (a pulse compressing device, a pulse expanding device) that converts a pulse width of a light pulse includes some kind of spectroscopic element as an essential component. As spectroscopic elements, there are mainly elements such as prisms utilizing substance-specific dispersion and elements such as diffraction gratings utilizing the diffraction effect due to its device structure.

Pulse width conversion devices including prisms as spectroscopic elements have a narrow variable range for a pulse width of a light pulse, and therefore, it is difficult to apply those to the chirped pulse amplification method. Then, pulse width conversion devices including diffraction gratings as spectroscopic elements have been widely used. FIG. 12 to FIG. 15 are diagrams showing configuration examples of pulse width conversion devices including diffraction gratings as spectroscopic elements.

A pulse width conversion device 2A shown in FIG. 12 includes four reflection-type diffraction gratings 31 to 34. In the pulse width conversion device 2A, an input light pulse Pi is diffracted to be dispersed by the reflection-type diffraction grating 31, and is diffracted to be a parallel beam of light rays by the reflection-type diffraction grating 32, and is diffracted to be converged by the reflection-type diffraction grating 33, and is diffracted to be coupled by the reflection-type diffraction grating 34, and is output as an output light pulse Po.

A pulse width conversion device 2B shown in FIG. 13 includes four transmission-type diffraction gratings 21 to 24. In the pulse width conversion device 2B, an input light pulse Pi is diffracted to be dispersed by the transmission-type diffraction grating 21, and is diffracted to be a parallel beam of light rays by the transmission-type diffraction grating 22, and is diffracted to be converged by the transmission-type diffraction grating 23, and is diffracted to be coupled by the transmission-type diffraction grating 24, and is output as an output light pulse Po.

Conventionally, the configuration of the pulse width conversion device 2A including the four reflection-type diffraction gratings 31 to 34 as shown in FIG. 12 has been mainly used. However, in comparison to the reflection-type diffraction gratings, the transmission-type diffraction gratings are thermally superior due to their low optical absorption, and are further superior in terms of price due to the production process. For this reason, in recent years, the configuration of the pulse width conversion device 2B including the four transmission-type diffraction gratings 21 to 24 as shown in FIG. 13 has been used. Further, as shown in FIG. 14 and FIG. 15, there are also configurations of pulse width conversion devices 2C and 2D including two transmission-type diffraction gratings.

The pulse width conversion device 2C shown in FIG. 14 includes the two transmission-type diffraction gratings 21 and 22. In the pulse width conversion device 2C, an input light pulse Pi is diffracted to be dispersed by the transmission-type diffraction grating 21, and is diffracted to be a parallel beam of light rays by the transmission-type diffraction grating 22, and its optical path is folded back by a rectangular prism 40. The light pulse whose optical path is folded back by the rectangular prism 40 is diffracted to be converged by the transmission-type diffraction grating 22, and is diffracted to be coupled by the transmission-type diffraction grating 21, and is output as an output light pulse Po.

The pulse width conversion device 2D shown in FIG. 15 as well includes the two transmission-type diffraction gratings 21 and 22. In the pulse width conversion device 2D, an input light pulse Pi is diffracted to be dispersed by the transmission-type diffraction grating 21, and is reflected by reflecting mirrors 41 and 42 in series, and is diffracted to be a parallel beam of light rays by the transmission-type diffraction grating 22, and its optical path is folded back by a rectangular prism 40. The light pulse whose optical path is folded back by the rectangular prism 40 is diffracted to be converged by the transmission-type diffraction grating 22, and is reflected by the reflecting mirrors 42 and 41 in series, and is diffracted to be coupled by the transmission-type diffraction grating 21, and is output as an output light pulse Po.

In FIG. 12 to FIG. 15, a direction in which the lattices of the respective diffraction gratings are extended is a direction perpendicular to the plane of paper, and a light pulse travels parallel to the plane of paper except for the time of folding back the optical path by the rectangular prism 40. The rectangular prism 40 reflects the light pulse by the two reflecting surfaces in series to move the optical path of the return light pulse parallel in the direction perpendicular to the plane of paper with respect to the optical path of the input light pulse.

As shown in FIG. 12 to FIG. 15, in general, the pulse width conversion devices need light pulse incidence onto their spectroscopic elements several times. The number of light pulse incidences onto the spectroscopic elements is four at minimum. In contrast to the pulse width conversion devices 2A and 2B shown in FIG. 12 and FIG. 13, the pulse width conversion devices 2C and 2D shown in FIG. 14 and FIG. 15 allow incidence of light pulses onto the respective diffraction gratings twice, so as to reduce the number of diffraction gratings. Further, the pulse width conversion device 2D shown in FIG. 15 can be configured by one long diffraction grating into which the diffraction gratings 21 and 22 are integrated.

CITATION LIST

Non Patent Literature

Non-Patent Document 1: Xiangyu Zhou, et al., "Generation of 28-fs pulses from a mode-locked ytterbium fiber oscillator", OPTICS EXPRESS, Vol. 16, No. 10, pp. 7055-7059 (2008)

SUMMARY OF INVENTION

Technical Problem

However, a configuration of a pulse width conversion device as described above requires at least two diffraction gratings or one long diffraction grating. In the configuration of the pulse width conversion device 2D shown in FIG. 15, the one diffraction grating is sufficient as long as a long diffraction grating is used, meanwhile, it is difficult to downsize the device due to geometric interference between the input light pulse Pi and the output light pulse Po, and the rectangular prism 40. In particular, when a diffraction grating with a large diffraction angle is used, this problem becomes conspicuous.

The present invention has been made in order to solve the above-described problems, and an object of the present invention is to provide a pulse width conversion device which is easily downsized. Further, another object is to provide an optical amplifier system including such a pulse width conversion device, in which the system is easily downsized.

Solution to Problem

A pulse width conversion device according to the present invention, which produces an output light pulse with a pulse width different from a pulse width of an input light pulse, the pulse width conversion device includes: (1) a spectroscopic element dispersing the input light pulse, input along a first optical path, to output the light rays at output angles according to their wavelengths along a second optical path, outputting a beam of light rays, input at incident angles according to their wavelengths along a third optical path, at a constant output angle along a fourth optical path, outputting the beam of light rays, input at a constant incident angle along a fifth optical path, at output angles according to their wavelengths along a sixth optical path, and coupling the beam of light rays, input at incident angles according to their wavelengths along a seventh optical path, to output it as the output light pulse along an eighth optical path, (2) a first optical system allowing the beam of light rays, output at the output angles according to their wavelengths along the second optical path from the spectroscopic element, to be input at the incident angles according to their wavelengths along the third optical path to the spectroscopic element, (3) a second optical system allowing the beam of light rays, output at the constant output angle along the fourth optical path from the spectroscopic element, to be input at the constant incident angle along the fifth optical path to the spectroscopic element, and (4) a third optical system allowing the beam of light rays, output at the output angles according to their wavelengths along the sixth optical path from the spectroscopic element, to be input at the incident angles according to their wavelengths along the seventh optical path to the spectroscopic element.

Moreover, the pulse width conversion device has the feature that, regarding input-output directions of the beams of light rays at the spectroscopic element, the input-output direction in the combination of the third optical path and the fourth optical path is different from the input-output direction in the combination of the first optical path and the second optical path.

An optical amplifier system according to the present invention includes: (1) an optical amplifier device optically amplifying a light pulse, and (2) the pulse width conversion device with the above-described configuration, to which the light pulse optically amplified by the optical amplifier device is input, and which compensates for dispersion of the input light pulse to output the light pulse.

Advantageous Effects of Invention

The pulse width conversion device or the optical amplifier system according to the present invention is easily downsized.

DESCRIPTION OF EMBODIMENTS

Hereinafter, an embodiment for carrying out the present invention will be described in detail referring to the accompanying drawings. In addition, in the description of the drawings, the same components are denoted by the same reference symbols, and overlapping descriptions will be omitted.

Figure 1:
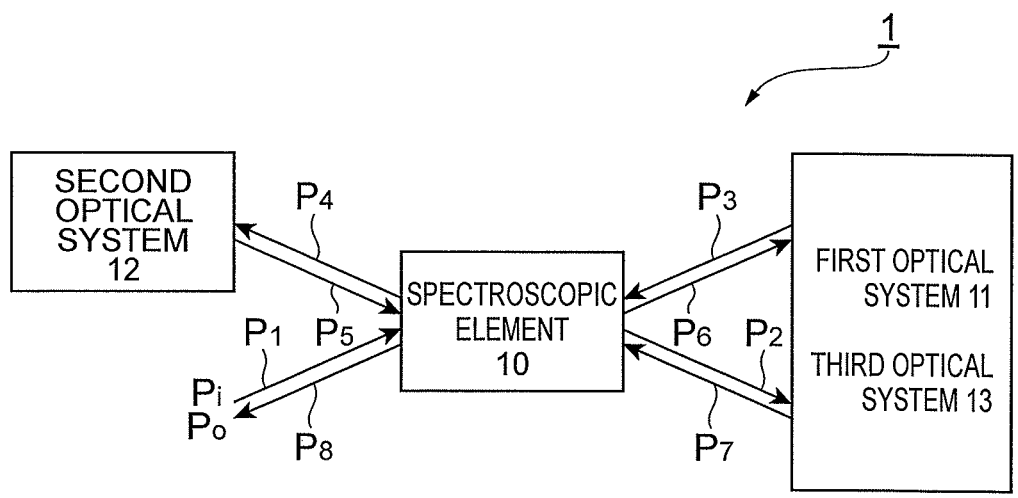
FIG. 1 is a diagram schematically showing a configuration of a pulse width conversion device 1 according to a present embodiment.

FIG. 1 is a diagram schematically showing a configuration of a pulse width conversion device 1 according to the present embodiment. The pulse width conversion device 1 according to the present embodiment includes a spectroscopic element 10, a first optical system 11, a second optical system 12, and a third optical system 13. In addition, the first optical system 11 and the third optical system 13 may have some of or all of the optical components in common. FIG. 1 is shown such that the first optical system 11 and the third optical system 13 have all of the optical components in common, and the first optical system 11 and the third optical system 13 are used in common.

The spectroscopic element 10 is capable of dispersing a beam of light rays input at a constant incident angle, according to each of wavelengths, to output the light rays having the respective wavelength components, at output angles according to the wavelengths. Further, when light rays having respective wavelength components are input thereto at incident angles according to the wavelengths, the spectroscopic element 10 is capable of outputting the light rays having the respective wavelength components at a constant output angle. The spectroscopic element 10 is, for example, a transmission-type diffraction grating or a reflection-type diffraction grating.

The spectroscopic element 10 disperses an input light pulse Pi, input along a first optical path $P_1$, to output the light rays at output angles according to their wavelengths along a second optical path $P_2$. The spectroscopic element 10 outputs a beam of light rays, input at incident angles according to their wavelengths along a third optical path $P_3$, at a constant output angle along a fourth optical path $P_4$. The spectroscopic element 10 outputs the beam of light rays, input at a constant incident angle along a fifth optical path $P_5$, at output angles according to their wavelengths along a sixth optical path $P_6$. Further, the spectroscopic element 10 couples the beam of light rays, input at incident angles according to their wavelengths along a seventh optical path $P_7$, to output it as an output light pulse Po along an eighth optical path $P_8$.

Here, when a beam of light rays is input at a constant incident angle along the fourth optical path $P_4$, the spectroscopic element 10 is capable of dispersing the beam of light rays to output those at output angles according to their wavelengths along the third optical path $P_3$, and further, when a beam of light rays is input at a constant incident angle along the eighth optical path $P_8$, the spectroscopic element 10 is capable of dispersing the beam of light rays to output those at output angles according to their wavelengths along the seventh optical path $P_7$. When beams of light rays are input at constant incident angles respectively along the first optical path $P_1$, the fourth optical path $P_4$, the fifth optical path $P_5$, and the eighth optical path $P_8$, the spectroscopic element 10 has an identical spectroscopic property.

The first optical system 11 causes the beam of light rays, output at the output angles according to their wavelengths along the second optical path $P_2$ from the spectroscopic element 10, to be input at the incident angles according to their wavelengths along the third optical path $P_3$ to the spectroscopic element 10. The second optical system 12 causes the beam of light rays, output at the constant output angle along the fourth optical path $P_4$ from the spectroscopic element 10, to be input at the constant incident angle along the fifth optical path $P_5$ to the spectroscopic element 10. Further, the third optical system 13 causes the beam of light rays, output at the output angles according to their wavelengths along the sixth optical path $P_6$ from the spectroscopic element 10, to be input at the incident angles according to their wavelengths along the seventh optical path $P_7$ to the spectroscopic element 10.

Regarding input-output directions of the beams of light rays with respect to the spectroscopic element 10, the input-output direction in the combination of the third optical path $P_3$ and the fourth optical path $P_4$ is different from the input-output direction in the combination of the first optical path $P_1$ and the second optical path $P_2$. Regarding input-output directions of the beams of light rays with respect to the spectroscopic element 10, the input-output direction in the combination of the fifth optical path $P_5$ and the sixth optical path $P_6$ may be matched to the input-output direction in the combination of the first optical path $P_1$ and the second optical path $P_2$, or may be matched to the input-output direction in the combination of the third optical path $P_3$ and the fourth optical path $P_4$.

Further, regarding input-output directions of the beams of light rays with respect to the spectroscopic element 10, the input-output direction in the combination of the seventh optical path $P_7$ and the eighth optical path $P_8$ may be matched to the input-output direction in the combination of the first optical path $P_1$ and the second optical path $P_2$, may be matched to the input-output direction in the combination of the third optical path $P_3$ and the fourth optical path $P_4$, or may be matched to the input-output direction in the combination of the fifth optical path $P_5$ and the sixth optical path $P_6$.

The incident angle when the beam of light rays is input along the fifth optical path $P_5$ to the spectroscopic element 10 may be equivalent to the output angle when the beam of light rays is output along the fourth optical path $P_4$ from the spectroscopic element 10. At this time, the output angles of the respective wavelength components when the beam of light rays is output along the sixth optical path $P_6$ from the spectroscopic element 10 are equivalent to the incident angles of the respective wavelength components when the beam of light rays is input along the third optical path $P_3$ to the spectroscopic element 10. In this way, regarding input-output directions of the beams of light rays at the spectroscopic element 10, when the fourth optical path $P_4$ and the fifth optical path $P_5$ are oppositely directed to each other and the third optical path $P_3$ and the sixth optical path $P_6$ are oppositely directed to each other, these optical paths are set so as not to overlap the beams of light rays with each other.

Further, the incident angles of the respective wavelength components when the beam of light rays is input along the seventh optical path $P_7$ to the spectroscopic element 10 may be equivalent to the output angles of the respective wavelength components when the beam of light rays is output along the second optical path $P_2$ from the spectroscopic element 10. At this time, the output angle when the output light pulse Po is output along the eighth optical path $P_8$ from the spectroscopic element 10 is equivalent to the incident angle when the input light pulse Pi is input along the first optical path $P_1$ to the spectroscopic element 10. In this way, regarding input-output directions of the beams of light rays at the spectroscopic element 10, when the second optical path $P_2$ and the seventh optical path $P_7$ are oppositely directed to each other and the first optical path $P_1$ and the eighth optical path $P_8$ are oppositely directed to each other, these optical paths are set so as not to overlap the beams of light rays with each other.

In the pulse width conversion device 1 according to the present embodiment, the input light pulse Pi is input at a constant incident angle along the first optical path $P_1$ to the spectroscopic element 10, to be dispersed according to each of wavelengths by the spectroscopic element 10. The light rays of the respective wavelength components dispersed by the spectroscopic element 10 are output at output angles according to their wavelengths along the second optical path $P_2$ from the spectroscopic element 10, and pass through the first optical system 11 to be input at incident angles according to their wavelengths along the third optical path $P_3$ to the spectroscopic element 10, and the light rays are output at a constant output angle along the fourth optical path $P_4$ from the spectroscopic element 10. The light rays of the respective wavelength components output along the fourth optical path $P_4$ from the spectroscopic element 10 are output, although at the constant output angle, from positions according to the wavelengths on the spectroscopic element 10, to be spatially separated from each other.

The light rays of the respective wavelength components output at the constant output angle along the fourth optical path $P_4$ from the spectroscopic element 10 pass through the second optical system 12 to be input at a constant incident angle along the fifth optical path $P_5$ to the spectroscopic element 10, and are output at output angles according to their wavelengths along the sixth optical path $P_6$ from the spectroscopic element 10, and the light rays pass through the third optical system 13 to be input at incident angles according to their wavelengths along the seventh optical path $P_7$ to the spectroscopic element 10. The light rays, input at the incident angles according to their wavelengths along the seventh optical path $P_7$ to the spectroscopic element 10, are coupled by the spectroscopic element 10, to be output as the output light pulse Po along the eighth optical path $P_8$ from the spectroscopic element 10. The fifth optical path $P_5$, the sixth optical path $P_6$, the seventh optical path $P_7$, and the eighth optical path $P_8$ may be oppositely directed to the first optical path $P_1$, the second optical path $P_2$, the third optical path $P_3$, and the fourth optical path $P_4$.

With respect to the output light pulse Po output along the eighth optical path $P_8$ from the spectroscopic element 10, its output angle is constant regardless of its wavelength, and the principal rays of the respective wavelength components are identical to each other. The pulse width conversion device 1 according to the present embodiment is capable of providing second or higher order dispersion in a frequency domain to the input light pulse Pi, so as to output the output light pulse Po. That is, the pulse width conversion device 1 according to the present embodiment is capable of producing the output light pulse Po with a pulse width different from a pulse width of the input light pulse Pi.

Hereinafter, specific configuration examples of the pulse width conversion device 1 according to the present embodiment will be described referring to FIG. 2 to FIG. 10.

Figure 2:
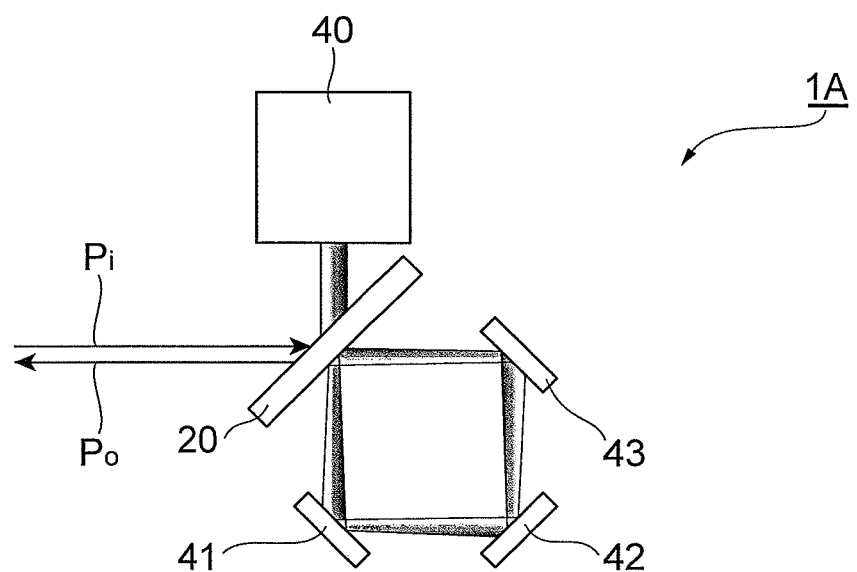
FIG. 2 is a diagram showing a configuration of a pulse width conversion device 1A.

FIG. 2 is a diagram showing a configuration of a pulse width conversion device 1A. The pulse width conversion device 1A shown in this figure includes a transmission-type diffraction grating 20 serving as the spectroscopic element 10, a rectangular prism 40 serving as a component of the second optical system 12, and reflecting mirrors 41 to 43 serving as components of the first optical system 11 and the third optical system 13 respectively.

Figure 3:
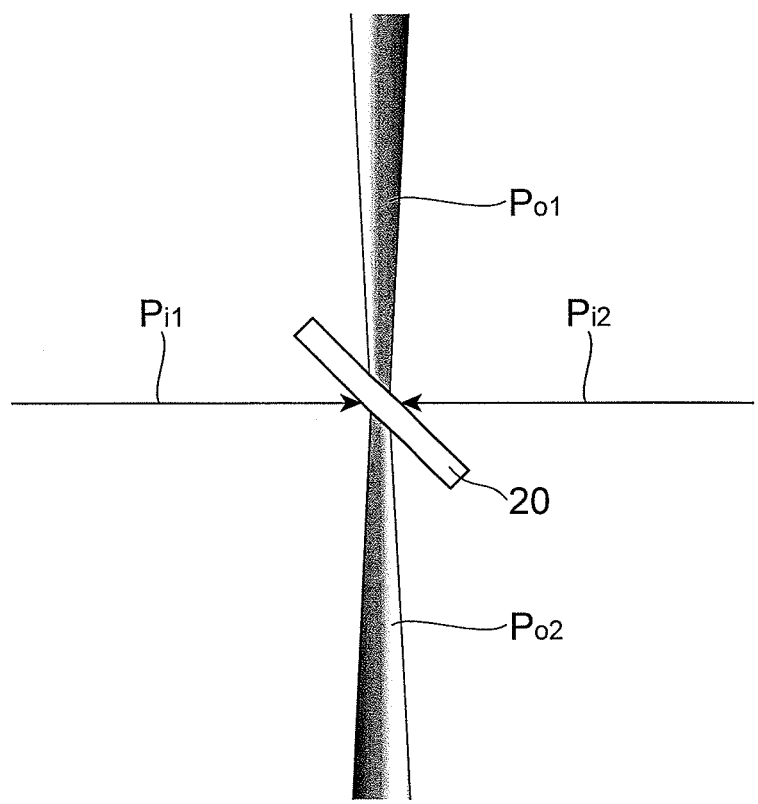
FIG. 3 is a diagram for explanation of a spectroscopic action of a transmission-type diffraction grating 20 included in the pulse width conversion device 1A.

The transmission-type diffraction grating 20 is, as shown in FIG. 3, capable of dispersing light $Pi_1$ input at a constant incident angle from a first side, to output light rays $Po_1$ of respective wavelength components at output angles according to their wavelengths to a second side, and is capable of dispersing light $Pi_2$ input at a constant incident angle from the second side, to output light rays $Po_2$ of respective wavelength components at output angles according to their wavelengths to the first side. Further, the transmission-type diffraction grating 20 may have a Littrow configuration in which an incident angle and an output angle (diffraction angle) are equivalent to one another.

Here, in FIG. 2 and FIG. 3, the direction in which the lattice of the transmission-type diffraction grating 20 is extended is a direction perpendicular to the plane of paper, and a light pulse travels parallel to the plane of paper except for the time of folding back the optical path by the rectangular prism 40. The rectangular prism 40 reflects the light pulse by the two reflecting surfaces in series to move the optical path of the return light pulse in a parallel manner in the direction perpendicular to the plane of paper with respect to the optical path of the input light pulse. It is preferable that the reflection reducing film is formed on the light input-output surface of the rectangular prism 40. This is the same as in the figures which will be hereinafter described.

In the pulse width conversion device 1A shown in FIG. 2, the input light pulse Pi is input at a constant incident angle to the transmission-type diffraction grating 20, to be dispersed according to the wavelengths by the transmission-type diffraction grating 20. The light rays of the respective wavelength components dispersed by the transmission-type diffraction grating 20 are output at output angles according to the wavelengths from the transmission-type diffraction grating 20, to be reflected by the reflecting mirrors 41, 42, and 43 in series, and thereafter, the light rays are input at incident angles according to their wavelengths to the transmission-type diffraction grating 20, to be output at a constant output angle from the transmission-type diffraction grating 20. The light rays of the respective wavelength components output from the transmission-type diffraction grating 20 are output, although at the constant output angle, from positions according to the wavelengths on the transmission-type diffraction grating 20, to be spatially separated from each other.

The optical path for the light rays of the respective wavelength components, output at the constant output angle from the transmission-type diffraction grating 20, is folded back by the rectangular prism 40, to be input at a constant incident angle to the transmission-type diffraction grating 20, and the light rays are output at output angles according to their wavelengths from the transmission-type diffraction grating 20, to be reflected by the reflecting mirrors 43, 42, and 41 in series, and thereafter, the light rays are input at incident angles according to their wavelengths to the transmission-type diffraction grating 20. The light rays input at the incident angles according to their wavelengths to the transmission-type diffraction grating 20 are coupled by the transmission-type diffraction grating 20, to be output as the output light pulse Po from the transmission-type diffraction grating 20.

With respect to the output light pulse Po output from the transmission-type diffraction grating 20, its output angle is constant regardless of the wavelengths, and the principal rays of the respective wavelength components are identical to each other. The output light pulse Po is provided with second or higher order dispersion in a frequency domain with respect to the input light pulse Pi, and has a pulse width different from a pulse width of the input light pulse Pi.

The pulse width conversion device 1A described above is suitably used as a pulse compressing device that compresses a pulse width of a light pulse at the final stage of a high-intensity ultrashort pulse laser device. The high-intensity ultrashort pulse laser device is configured to optically amplify a light pulse using the aforementioned chirped pulse amplification method. As a practical matter, the pulse width of a chirped light pulse (with a central wavelength of 1030 nm, energy of 0.2 mJ, and a pulse width 30 ps), which is generated at a repetition frequency of 20 kHz with a regenerative amplification system using Yb:YAG ceramic as an optical amplification medium, was compressed by the pulse width conversion device 1A. The transmission-type diffraction grating 20, with the number of lines 1370 lines/mm, is configured to output light of a wavelength of 1030 nm, which has been input at an incident angle of 45 degrees, at a diffraction angle of 45 degrees. It is set that an optical path length from the reflecting mirror 41 via the reflecting mirror 42 to the reflecting mirror 43 is 30 cm. When a light pulse output from the above-described regenerative amplification system was input to the pulse width conversion device 1A for compressing the pulse width, the pulse width of the output light pulse was 1 ps. In this way, by using the pulse width conversion device 1A, the pulse width could be actually compressed from 30 ps to 1 ps.

Figure 4:
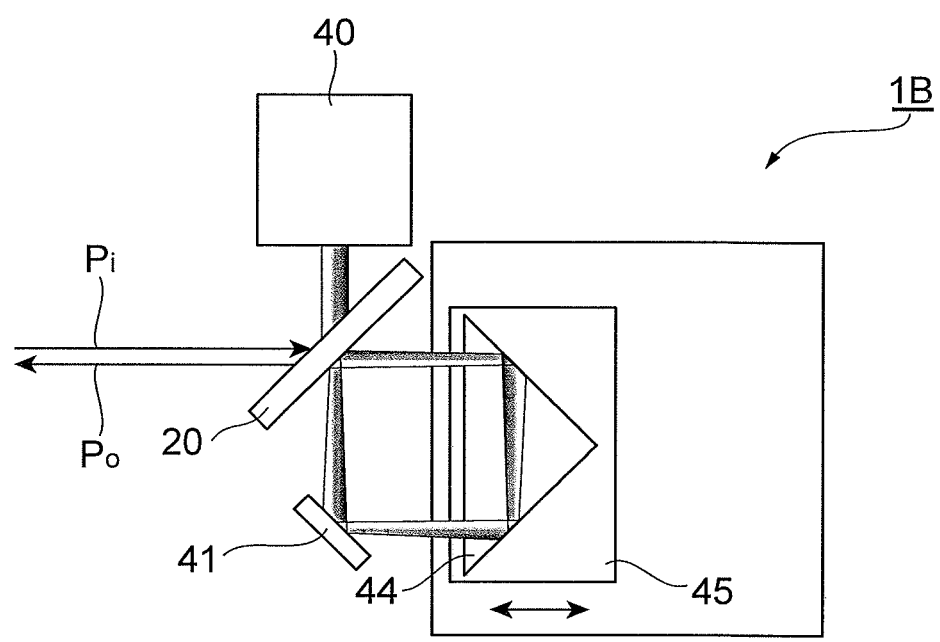
FIG. 4 is a diagram showing a configuration of a pulse width conversion device 1B.

FIG. 4 is a diagram showing a configuration of a pulse width conversion device 1B. The pulse width conversion device 1B shown in this figure includes the transmission-type diffraction grating 20 serving as the spectroscopic element 10, the rectangular prism 40 serving as a component of the second optical system 12, and the reflecting mirror 41, a rectangular prism 44, and a movable stage 45 serving as components of the first optical system 11 and the third optical system 13 respectively.

In comparison to the configuration of the pulse width conversion device 1A shown in FIG. 2, the pulse width conversion device 1B shown in FIG. 4 is different in the point that the rectangular prism 44 is included in place of the reflecting mirrors 42 and 43, and in the point that the movable stage 45 is further included.

The rectangular prism 44 reflects a light pulse by the two reflecting surfaces in series, to change the input and return respective traveling directions of the light pulse. It is preferable that the reflection reducing film is formed on the light input-output surface of the rectangular prism 44. The movable stage 45 operates as an optical path length adjusting section that moves the rectangular prism 44 parallel, to adjust an optical path length from light output from the transmission-type diffraction grating 20 to light input to the transmission-type diffraction grating 20 in the first optical system 11 and the third optical system 13 respectively.

In the pulse width conversion device 1B as well, with respect to the output light pulse Po output from the transmission-type diffraction grating 20, its output angle is constant regardless of the wavelengths, and the principal rays of the respective wavelength components are identical to each other. The output light pulse Po is provided with second or higher order dispersion in a frequency domain with the input light pulse Pi, and has a pulse width different from a pulse width of the input light pulse Pi.

In particular, in the pulse width conversion device 1B, because the movable stage 45 serving as an optical path length adjusting section is provided, an optical path length from light output from the transmission-type diffraction grating 20 to light input to the transmission-type diffraction grating 20 is adjusted, respectively in the first optical system 11 and the third optical system 13. Thereby, a dispersion amount in the frequency domain provided to the input light pulse Pi is adjusted, to adjust an amount of compression or expansion of the pulse width of the output light pulse Po with respect to the input light pulse Pi.

Figure 5:
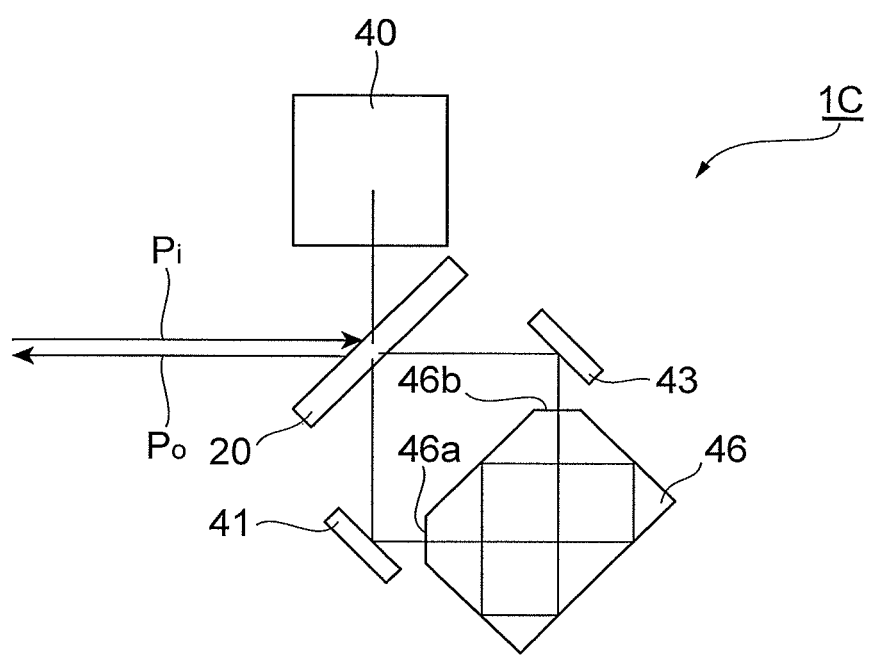
FIG. 5 is a diagram showing a configuration of a pulse width conversion device 1C.

FIG. 5 is a diagram showing a configuration of a pulse width conversion device 1C. The pulse width conversion device 1C shown in this figure includes the transmission-type diffraction grating 20 serving as the spectroscopic element 10, the rectangular prism 40 serving as a component of the second optical system 12, and the reflecting mirrors 41 and 43 and a functional block 46 serving as components of the first optical system 11 and the third optical system 13 respectively. In comparison to the configuration of the pulse width conversion device 1A shown in FIG. 2, the pulse width conversion device 1C shown in FIG. 5 is different in the point that the functional block 46 is included in place of the reflecting mirror 42.

The functional block 46 allows light reaching an input-output surface 46a from the reflecting mirror 41 to be input to its inside, and totally reflects the light a plurality of times by its inside wall surfaces, to thereafter output the light from an input-output surface 46b to the reflecting mirror 43. Further, the functional block 46 allows the light reaching the input-output surface 46b from the reflecting mirror 43 to be input to its inside, and totally reflects the light a plurality of times by its inside wall surfaces, to thereafter output the light from the input-output surface 46a to the reflecting mirror 41. It is preferable that the functional block 46 is made of a material of high transmittance at a wavelength of light to be input, and made of quartz glass, for example. It is preferable that the reflection reducing films are formed on the input-output surfaces 46a and 46b of the functional block 46.

In the pulse width conversion device 1C as well, with respect to the output light pulse Po output from the transmission-type diffraction grating 20, its output angle is constant regardless of the wavelengths, and the principal rays of the respective wavelength components are identical to each other. The output light pulse Po is provided with second or higher order dispersion in a frequency domain with the input light pulse Pi, and has a pulse width different from a pulse width of the input light pulse Pi.

In particular, in the pulse width conversion device 1C, because the functional block 46 is provided respectively in the first optical system 11 and the third optical system 13, it is possible to lengthen an optical path length from light output from the transmission-type diffraction grating 20 to light input to the transmission-type diffraction grating 20 in the first optical system 11 and the third optical system 13 respectively regardless of its small installation area. Thereby, it is possible to increase a dispersion amount in the frequency domain provided to the input light pulse Pi, and it is possible to increase an amount of compression or expansion of the pulse width of the output light pulse Po with respect to the input light pulse Pi. For example, provided that a beam of light rays input to the functional block 46 on an installation area of 5 cm×4.4 cm is revolved about three and a half times by total reflection internally, it is possible to output the light after propagation thereof by a distance of 50 cm.

Figure 6:
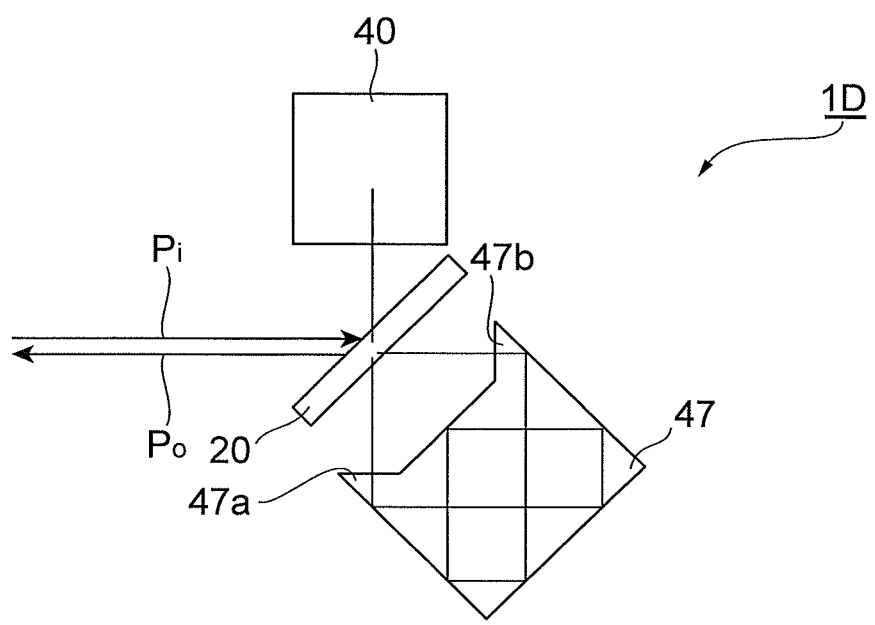
FIG. 6 is a diagram showing a configuration of a pulse width conversion device 1D.

FIG. 6 is a diagram showing a configuration of a pulse width conversion device 1D. The pulse width conversion device 1D shown in this figure includes the transmission-type diffraction grating 20 serving as the spectroscopic element 10, the rectangular prism 40 serving as a component of the second optical system 12, and a functional block 47 serving as a component of the first optical system 11 and the third optical system 13 respectively. In comparison to the configuration of the pulse width conversion device 1A shown in FIG. 2, the pulse width conversion device 1D shown in FIG. 6 is different in the point that the functional block 47 is included in place of the reflecting mirrors 41 to 43.

The functional block 47 allows light reaching an input-output surface 47a from the transmission-type diffraction grating 20 to be input to its inside, and totally reflects the light a plurality of times by its inside wall surfaces, to thereafter output the light from an input-output surface 47b to the transmission-type diffraction grating 20. Further, the functional block 47 allows the light reaching the input-output surface 47b from the transmission-type diffraction grating 20 to be input to its inside, and totally reflects the light a plurality of times by its inside wall surfaces, to thereafter output the light from the input-output surface 47a to the transmission-type diffraction grating 20. It is preferable that the functional block 47 is made of a material of high transmittance at a wavelength of light to be input, and made of quartz glass, for example. It is preferable that the reflection reducing films are formed on the input-output surfaces 47a and 47b of the functional block 47.

In the pulse width conversion device 1D as well, with respect to the output light pulse Po output from the transmission-type diffraction grating 20, its output angle is constant regardless of the wavelengths, and the principal rays of the respective wavelength components are identical to each other. The output light pulse Po is provided with second or higher order dispersion in a frequency domain with the input light pulse Pi, and has a pulse width different from a pulse width of the input light pulse Pi.

Further, in the pulse width conversion device 1D as well, because the functional block 47 is provided respectively in the first optical system 11 and the third optical system 13, it is possible to lengthen an optical path length from light output from the transmission-type diffraction grating 20 to light input to the transmission-type diffraction grating 20 in the first optical system 11 and the third optical system 13 respectively regardless of its small installation area. Thereby, it is possible to increase a dispersion amount in the frequency domain provided to the input light pulse Pi, and it is possible to increase an amount of compression or expansion of the pulse width of the output light pulse Po with respect to the input light pulse Pi.

Moreover, because the first optical system 11 and the third optical system 13 are integrated, it is easy to downsize the pulse width conversion device 1D, and it is also easy to handle the device.

Figure 7:
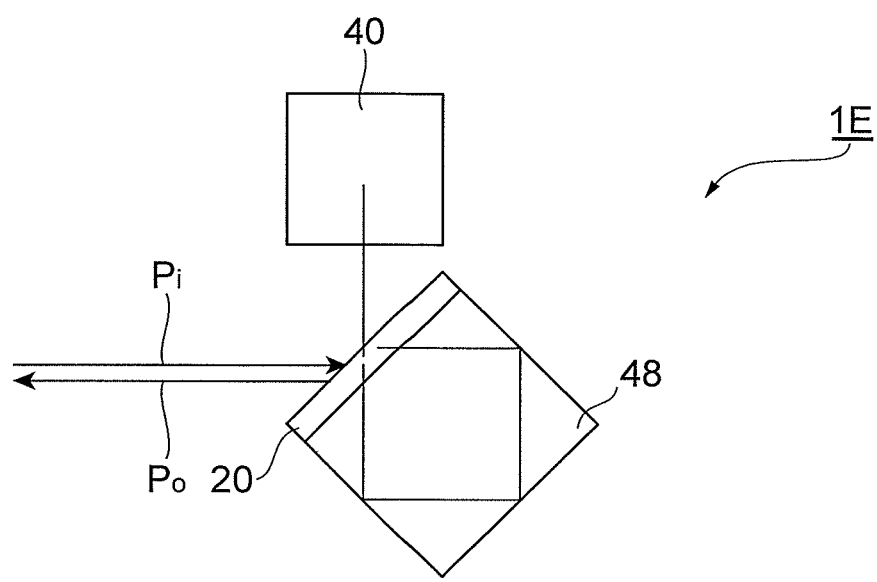
FIG. 7 is a diagram showing a configuration of a pulse width conversion device 1E.

FIG. 7 is a diagram showing a configuration of a pulse width conversion device 1E. The pulse width conversion device 1E shown in this figure includes the transmission-type diffraction grating 20 serving as the spectroscopic element 10, the rectangular prism 40 serving as a component of the second optical system 12, and a functional block 48 serving as a component of the first optical system 11 and the third optical system 13 respectively. In comparison to the configuration of the pulse width conversion device 1A shown in FIG. 2, the pulse width conversion device 1E shown in FIG. 7 is different in the point that the functional block 48 is included in place of the reflecting mirrors 41 to 43.

The functional block 48 is connected to the transmission-type diffraction grating 20 by an optical contact, to be integrated with the transmission-type diffraction grating 20. The functional block 48 allows light output from the transmission-type diffraction grating 20 to be input to its inside, and totally reflects the light a plurality of times by its inside wall surfaces, to thereafter output the light to the transmission-type diffraction grating 20. It is preferable that the functional block 48 is made of a material of high transmittance at a wavelength of light to be input, and made of quartz glass, for example. In the case where an incident angle of the beam of light rays is less than or equal to the total reflection angle at the time of reflection by the inside wall surfaces of the functional block 48, it is preferable that the suitable reflection films are formed on the surfaces subjected thereto.

In the pulse width conversion device 1E as well, with respect to the output light pulse Po output from the transmission-type diffraction grating 20, its output angle is constant regardless of the wavelengths, and the principal rays of the respective wavelength components are identical to each other. The output light pulse Po is provided with second or higher order dispersion in a frequency domain with the input light pulse Pi, and has a pulse width different from a pulse width of the input light pulse Pi.

Further, in the pulse width conversion device 1E as well, because the functional block 48 is provided respectively in the first optical system 11 and the third optical system 13, it is possible to lengthen an optical path length from light output from the transmission-type diffraction grating 20 to light input to the transmission-type diffraction grating 20 in the first optical system 11 and the third optical system 13 respectively regardless of its small installation area. Thereby, it is possible to increase a dispersion amount in the frequency domain provided to the input light pulse Pi, and it is possible to increase an amount of compression or expansion of the pulse width of the output light pulse Po with respect to the input light pulse Pi.

Moreover, because the spectroscopic element 10 (the transmission-type diffraction grating 20), the first optical system 11, and the third optical system 13 are integrated, it is easy to downsize the pulse width conversion device 1E, and it is also easy to handle the device.

Figure 8:
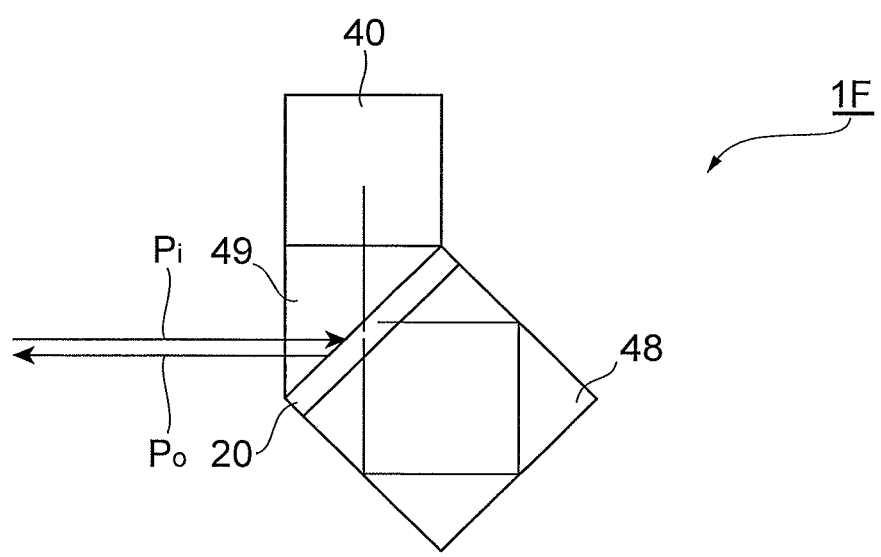
FIG. 8 is a diagram showing a configuration of a pulse width conversion device 1F.

FIG. 8 is a diagram showing a configuration of a pulse width conversion device 1F. The pulse width conversion device 1F shown in this figure includes the transmission-type diffraction grating 20 serving as the spectroscopic element 10, the rectangular prism 40 and a prism 49 serving as components of the second optical system 12, and the functional block 48 serving as a component of the first optical system 11 and the third optical system 13 respectively. In comparison to the configuration of the pulse width conversion device 1E shown in FIG. 7, the pulse width conversion device 1F shown in FIG. 8 is different in the point that the prism 49 is further included.

The prism 49 is connected to the transmission-type diffraction grating 20 by an optical contact, and is further connected to the rectangular prism 40 as well by an optical contact. It is preferable that the prism 49 is made of a material of high transmittance at a wavelength of light to be input, and made of quartz glass, for example. Thereby, enabling the device to suitably operate even if the reflection reducing film on the input-output surface of the rectangular prism 40 is omitted. However, it is preferable that the reflection reducing film is formed on the input-output surface for the input light pulse Pi and the output light pulse Po of the rectangular prism 49.

In the pulse width conversion device 1F as well, with respect to the output light pulse Po output from the transmission-type diffraction grating 20, its output angle is constant regardless of the wavelengths, and the principal rays of the respective wavelength components are identical to each other. The output light pulse Po is provided with second or higher order dispersion in a frequency domain with respect to the input light pulse Pi, and has a pulse width different from a pulse width of the input light pulse Pi.

Further, in the pulse width conversion device 1F as well, because the functional block 48 is provided respectively in the first optical system 11 and the third optical system 13, it is possible to lengthen an optical path length from light output from the transmission-type diffraction grating 20 to light input to the transmission-type diffraction grating 20 in the first optical system 11 and the third optical system 13 respectively regardless of its small installation area. Thereby, it is possible to increase a dispersion amount in the frequency domain provided to the input light pulse Pi, and it is possible to increase an amount of compression or expansion of the pulse width of the output light pulse Po with respect to the input light pulse Pi.

Moreover, because the spectroscopic element 10 (the transmission-type diffraction grating 20), the first optical system 11, the second optical system 12, and the third optical system 13 are integrated, it is easy to downsize the pulse width conversion device 1E, and it is also easy to handle the device.

Figure 9:
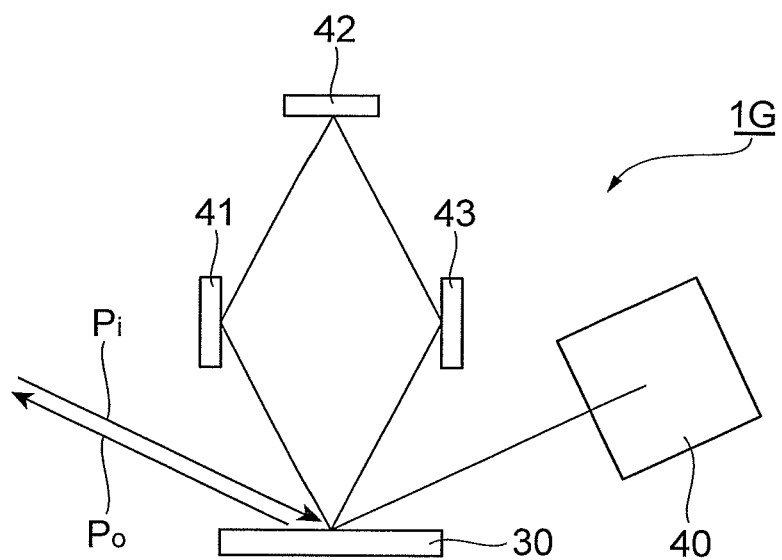
FIG. 9 is a diagram showing a configuration of a pulse width conversion device 1G.

FIG. 9 is a diagram showing a configuration of a pulse width conversion device 1G. The pulse width conversion device 1G shown in this figure includes a reflection-type diffraction grating 30 serving as the spectroscopic element 10, the rectangular prism 40 serving as a component of the second optical system 12, and the reflecting mirrors 41 to 43 serving as components of the first optical system 11 and the third optical system 13 respectively. In comparison to the configuration of the pulse width conversion device 1A shown in FIG. 2, the pulse width conversion device 1G shown in FIG. 9 is different in the point that the reflection-type diffraction grating 30 is included in place of the transmission-type diffraction grating 20.

Figure 10:
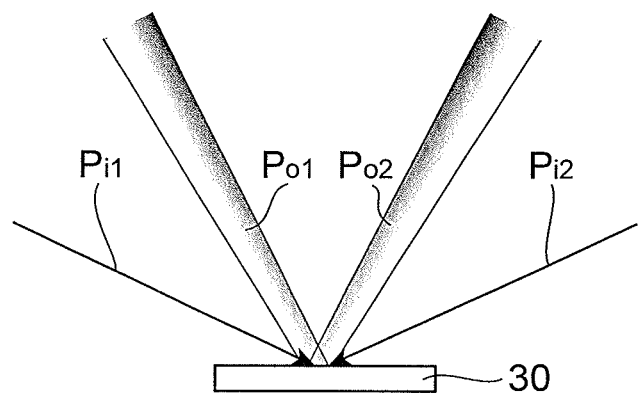
FIG. 10 is a diagram for explanation of a spectroscopic action of a reflection-type diffraction grating 30 included in the pulse width conversion device 1G.

The reflection-type diffraction grating 30 is, as shown in FIG. 10, capable of dispersing light $Pi_1$ input at a constant incident angle from a first side, to output light rays $Po_1$ of respective wavelength components at output angles according to their wavelengths to the first side, and is capable of dispersing light $Pi_2$ input at a constant incident angle from a second side (which is in a symmetrical relationship with the incident direction of the light $Pi_1$ over the normal line of the diffraction plane), to output light rays $Po_2$ of respective wavelength components at output angles according to their wavelengths to the second side. For example, it is set that the central wavelength of light rays is 1030 nm. It is set that the number of lines of the reflection-type diffraction grating 30 is 1250 lines/mm. At this time, it is possible to output the light of a wavelength of 1030 nm, which is input at an incident angle of 50 degrees, at a diffraction angle of 31 degrees. However, it is impossible for the reflection-type diffraction grating 30 to have a Littrow configuration in which an incident angle and an output angle (diffraction angle) are equivalent to one another.

In the pulse width conversion device 1G shown in FIG. 9, the input light pulse Pi is input at a constant incident angle to the reflection-type diffraction grating 30, to be dispersed according to the wavelengths by the reflection-type diffraction grating 30. The light rays of the respective wavelength components dispersed by the reflection-type diffraction grating 30 are output at output angles according to the wavelengths from the reflection-type diffraction grating 30, to be reflected by the reflecting mirrors 41, 42, and 43 in series, and thereafter, the light rays are input at incident angles according to their wavelengths to the reflection-type diffraction grating 30, to be output at a constant output angle from the reflection-type diffraction grating 30. The light rays of the respective wavelength components output from the reflection-type diffraction grating 30 are output, although at the constant output angle, from positions according to the wavelengths on the reflection-type diffraction grating 30, to be spatially separated from each other.

The optical path for the light rays of the respective wavelength components, output at the constant output angle from the reflection-type diffraction grating 30, is folded back by the rectangular prism 40, to be input at a constant incident angle to the reflection-type diffraction grating 30, and the light rays are output at output angles according to their wavelengths from the reflection-type diffraction grating 30, to be reflected by the reflecting mirrors 43, 42, and 41 in series, and thereafter, the light rays are input at incident angles according to their wavelengths to the reflection-type diffraction grating 30. The light rays input at the incident angles according to their wavelengths to the reflection-type diffraction grating 30 are coupled by the reflection-type diffraction grating 30, to be output as the output light pulse Po from the reflection-type diffraction grating 30.

With respect to the output light pulse Po output from the reflection-type diffraction grating 30, its output angle is constant regardless of the wavelengths, and the principal rays of the respective wavelength components are identical to each other. The output light pulse Po is provided with second or higher order dispersion in a frequency domain with respect to the input light pulse Pi, and has a pulse width different from a pulse width of the input light pulse Pi.

Next, an embodiment of an optical amplifier system including the pulse width conversion device according to the present embodiment and the optical amplifier device will be described. An optical amplifier system according to the present embodiment includes an optical amplifier device that optically amplifies a light pulse, and a pulse width conversion device that compresses a pulse width of the light pulse optically amplified by the optical amplifier device to output the light pulse, and, for example, has a configuration including the pulse width conversion device in an ultrashort pulse laser light source, an MOPA (Master Oscillator Power Amplifier), or the like. Because it is easy to downsize the pulse width conversion devices 1, and 1A to 1G according to the embodiments, it is useful to use those as devices to compensate for dispersion of an ultrashort pulsed laser light. In particular, it is effective to apply those to an ultrashort pulse fiber laser device as shown in FIG. 11.

Figure 11:
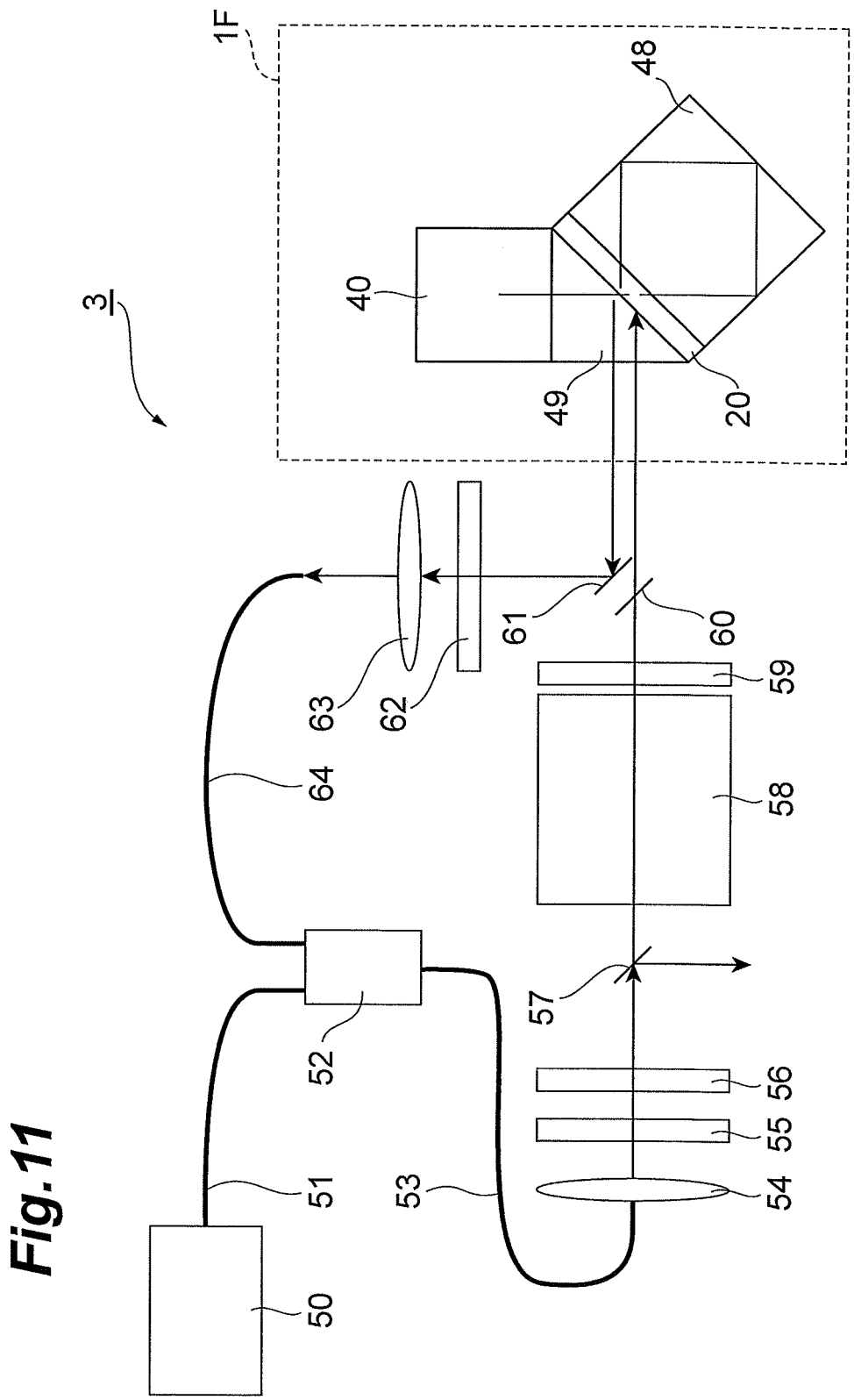
FIG. 11 is a diagram showing a configuration of an optical amplifier system 3 according to the present embodiment.
Figure 12:
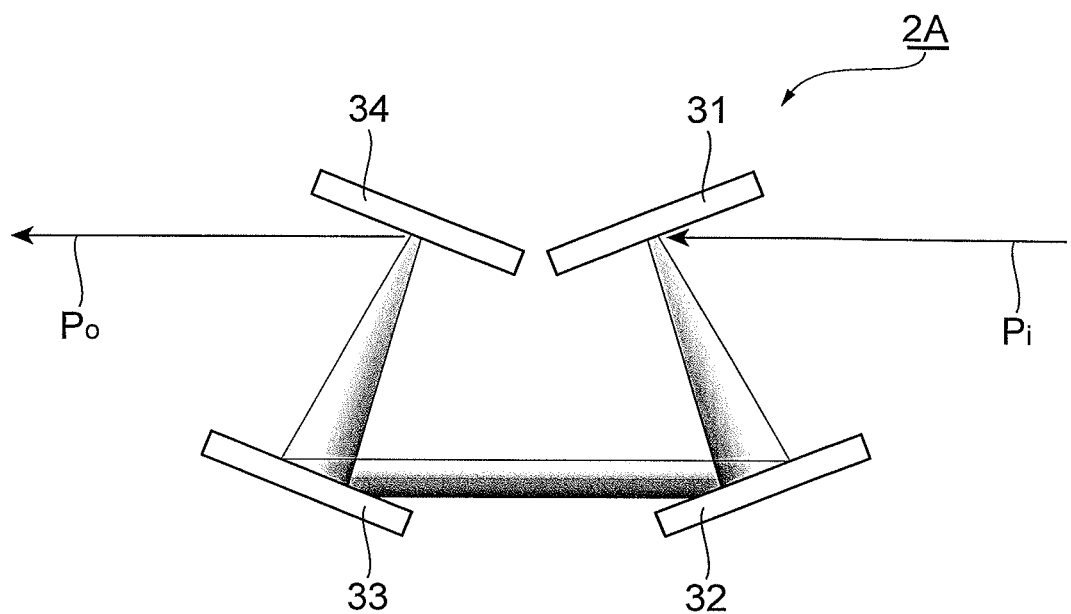
FIG. 12 is a diagram showing a configuration example of a pulse width conversion device including reflection-type diffraction gratings as spectroscopic elements.
Figure 13:
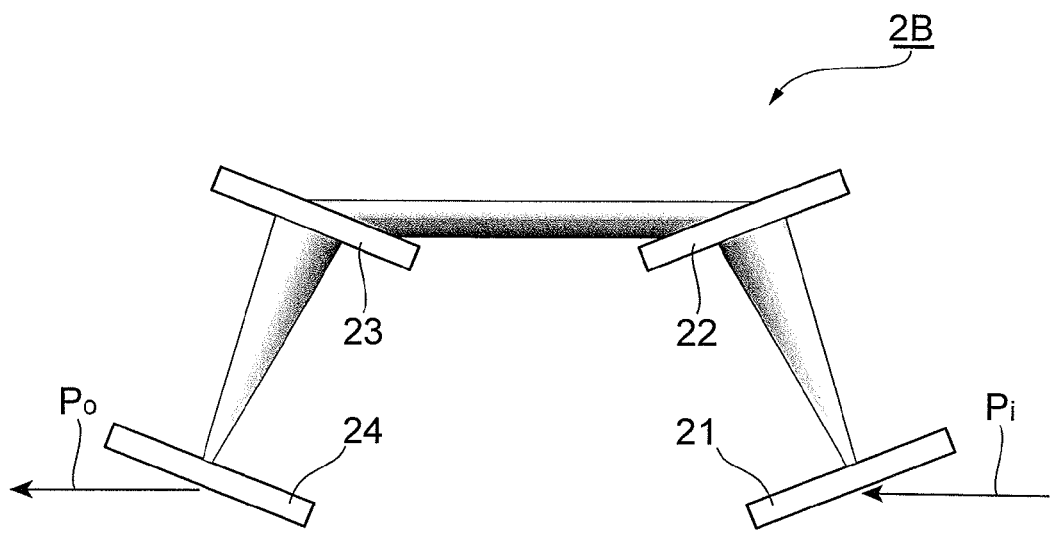
FIG. 13 is a diagram showing a configuration example of a pulse width conversion device including transmission-type diffraction gratings as spectroscopic elements.
Figure 14:
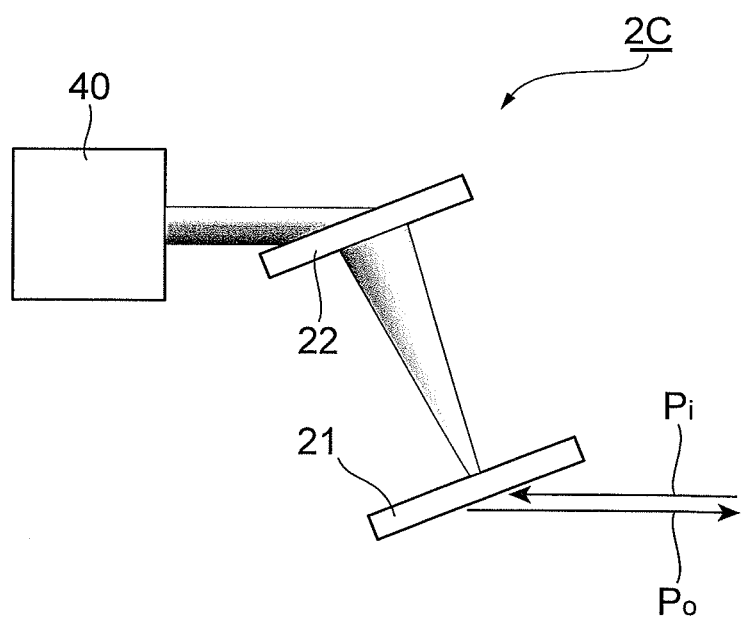
FIG. 14 is a diagram showing a configuration example of a pulse width conversion device including transmission-type diffraction gratings as spectroscopic elements.

FIG. 11 is a diagram showing a configuration of an optical amplifier system 3 according to the present embodiment. The optical amplifier system 3 shown in this figure includes an excitation LD 50, an LD light guiding fiber 51, an optical coupler 52, a Yb-doped optical fiber 53, a collimating lens 54, a λ/4 plate 55, a λ/2 plate 56, a polarization beam splitter 57, a Faraday rotator 58, a λ/2 plate 59, a polarization beam splitter 60, a reflecting mirror 61, a λ/4 plate 62, a condensing lens 63, a single-mode optical fiber 64, and the pulse width conversion device 1F shown in FIG. 8.

The optical amplifier system 3 performs mode-locked pulse oscillation by excitation of the Yb-doped optical fiber 53 with excitation light output from the excitation LD (Laser Diode) 50. The front end surface of the excitation LD 50 and the LD light guiding fiber 51 are optically coupled to one another. The LD light guiding fiber 51 has a length of 3.2 m, and has a fiber Bragg grating structure. The Bragg grating of the LD light guiding fiber 51 and the rear end surface of the excitation LD 50 compose an external resonator, and the excitation light at a wavelength of 976 nm according to a period of the Bragg grating is output as a continuous wave at 400 mW.

The excitation light is supplied to the single-mode Yb-doped optical fiber 53 with a length of 0.8 m via the optical coupler 52, to excite the doped Yb ions. This excitation generates emission light in the Yb-doped optical fiber 53. This emission light is emitted from the Yb-doped optical fiber 53, to be thereafter brought out as parallel light rays to the space by the collimating lens 54, and the light rays are converted into a predetermined polarization state by the λ/4 plate 55 and the λ/2 plate 56, to be incident on the polarization beam splitter 57.

The light incident on the polarization beam splitter 57 is partially reflected and split by the polarization beam splitter 57, to be brought out. The light transmitting through the polarization beam splitter 57 to stay in the optical resonator passes through a Faraday isolator configured by the Faraday rotator 58, the λ/2 plate 59, and the polarization beam splitter 60, and thereafter, the pulse width of the light is converted by the pulse width conversion device 1F.

The light whose pulse width is converted by the pulse width conversion device 1F to be output is reflected by the reflecting mirror 61, and is converted into a predetermined polarization state by the λ/4 plate 62, and the light is collected by the condensing lens 63, to be incident on the single-mode optical fiber 64 with a length of 1.2 m. The light input to the single-mode optical fiber 64 is input to the Yb-doped optical fiber 53 via the optical coupler 52.

In this way, the optical amplifier system 3 according to the present embodiment has the ring-type optical resonator, to cause stimulated emission in the Yb-doped optical fiber 53 in the optical resonator, and outputs some of the stimulated emission light to the outside from the polarization beam splitter 57. Further, the optical amplifier system 3 according to the present embodiment includes the pulse width conversion device according to the present embodiment (in particular, the pulse width conversion device 1F) in the optical resonator.

In order to achieve mode-locked oscillation in the optical amplifier system 3 according to the present embodiment, it is necessary to adjust dispersion in the laser resonator. Because large dispersion is provided to light passing through an optical fiber in general, an element to compensate for such large dispersion is required. In particular, all of the optical materials with high transmittance show positive dispersion in a wavelength region less than or equal to 1300 nm, and therefore, in the case where an ultrashort light pulse at a wavelength of 1300 nm or less is produced by a fiber laser, a negative dispersion optical system which is specially designed is required.

Conventionally, a pulse compressing device based on a prism pair or a diffraction grating pair has been used as such a negative dispersion optical system, however, the proportion of the size to the entire fiber laser is high, which has impeded downsizing thereof. Further, in recent years, a negative dispersion optical system using a photonic crystal fiber has been used, however, there have been difficulties in designing, lack of flexibility in conditions, expense, and difficulty in adjustment.

The optical amplifier system 3 according to the present embodiment includes the pulse width conversion device according to the present embodiment (in particular, the pulse width conversion device 1F) as a negative dispersion optical system in the optical resonator. It is possible to design the pulse width conversion device 1F by use of usual diffraction optics, and it is also possible to respond to changes in conditions, for example, by changing the size of the functional block 48, and in addition, downsizing thereof and price reduction can be realized, and it is possible to easily perform adjustment on the incident light.

For example, because one side of the functional block 48 is 2.8 mm, the pulse width conversion device 1F is formed into a size of centimeters, that is compact enough so as not to matter what proportion the size is to the entire optical amplifier system 3. With this configuration, the optical amplifier system 3 is capable of emitting a light pulse in a wavelength band of 1010 nm to 1050 nm and with a pulse width of 1.3 ps, at an average output of 130 mW with a repetition of 40 MHz by a mode-locked operation. Moreover, the light emitted from the polarization beam splitter 57 is a positively-chirped pulse, and therefore, the pulse width of the emitted light is compressed by the pulse width conversion device according to the present embodiment, to be able to obtain emitted light which is pulsed to be short up to 50 fs.

The pulse width conversion devices according to the present embodiment which are described above in detail are capable of performing the following effects. In comparison to the conventional devices, in the pulse width conversion device according to the present embodiment, the required number of diffraction gratings is reduced, and it is possible to downsize the diffraction grating.

Figure 15:
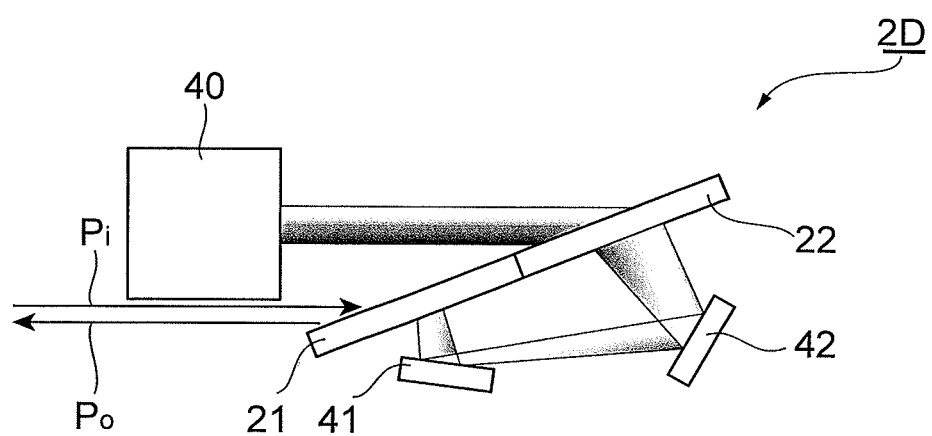
FIG. 15 is a diagram showing a configuration example of a pulse width conversion device including transmission-type diffraction gratings as spectroscopic elements.

In the pulse width conversion device 2D shown in FIG. 15, an optical path is folded back by the rectangular prism 40, to produce many portions that the optical paths come to close and parallel, and therefore, it is difficult to downsize the device due to geometric interference of the optical elements. On the other hand, in the pulse width conversion devices according to the present embodiment, because the close optical paths are not parallel to each other, geometric interference of the optical elements or the mounts is eased.

Due to the reduction in the required number of diffraction gratings and the decrease in geometric interference, it is possible to reduce the installation area required for composing the pulse width conversion device. Thereby, it is possible to realize the compact arrangement of the pulse width conversion device.

The pulse width conversion device is a device which is unavoidably arranged at the final stage of a high-intensity ultrashort pulse laser device in some way. Therefore, downsizing of the pulse width conversion device can contribute to downsizing of the entire high-intensity ultrashort pulsed laser device.

In order to adjust an amount of change in pulse width, a mechanism for changing an optical axis length of the dispersed portion is required. In the present embodiment, because the plurality of incident angles of light onto the diffraction grating are utilized, it is possible to select a plurality of directions of the optical path length changing mechanism, which increases the design freedom.

Further, the pulse width conversion device according to the present embodiment may use one of a transmission-type diffraction grating and a reflection-type diffraction grating, however, when a transmission-type diffraction grating is used, it is possible to perform the following effects.

A transmission-type diffraction grating may have a configuration (Littrow configuration) in which an incident angle (an angle made by the incident light and a normal line of the diffraction grating plane) and a diffraction angle (an angle made by the diffracted light and a normal line of the diffraction grating plane) are equivalent to each other. On the other hand, by a reflection-type diffraction grating, respective optical paths of incident light and diffracted light are overlapped with each other, which makes it impossible to have a Littrow configuration. For this reason, in general, it is possible to design a transmission-type diffraction grating so as to have a diffraction efficiency higher than that of a reflection-type diffraction grating.

For example, it is possible to manufacture a transmission-type diffraction grating having a diffraction efficiency of 96% for light at a wavelength of 1030 nm. On the other hand, a diffraction efficiency of a metal-evaporated type reflection-type diffraction grating is approximately 92%, that is a typical value of a high-quality element in the market. Because the light is incident on the diffraction grating four times in the present embodiment, the light use efficiency in the entire pulse width conversion device is in proportion to the fourth power of the diffraction efficiency. The 96% and 92% to the fourth power are 85% and 72%. From this reason, it is clear that the configuration using a transmission-type diffraction grating is more effective.

Some of the components which have not diffracted (light loss) of the light incident on the reflection-type diffraction grating are absorbed into the metal evaporated surface of the diffraction grating, which causes heat generation. This heat generation becomes a major problem at the time of using in the pulse width converter of a high-repetitive ultrashort pulse laser amplifier with a high average output. In particular, with respect to reflection-type diffraction gratings which are available at prevailing prices and ordinarily used, the base surfaces of their metal evaporated films are made of resin, which have a significant thermal effect. A thermal effect causes a distortion of a diffraction plane, which brings about deterioration in quality of laser light such as a decrease in diffraction efficiency or a wavefront distortion of a diffracted light. On the other hand, by a transmission-type diffraction grating, a light loss is mostly not absorbed into the substrate, to become transmitted or scattered light, which suppresses heat generation of the substrate. Further, in the case of a transmission-type diffraction grating, even a substrate made of all-quartz glass is available at an inexpensive price, and there is a small distortion of the substrate due to heat generation.

A transmission-type diffraction grating made of quartz glass has a damage threshold higher by several digits than that of a metal-evaporated reflection-type diffraction grating. Therefore, in the case where a transmission-type diffraction grating is used, it is possible to configure a pulse width conversion device to be effective for a high peak output (peak power) of light emitted from an ultrashort pulsed laser amplifier.

As shown in FIG. 3, the transmission-type diffraction grating is capable of setting the optical paths in the spaces on the both sides of the substrate. On the other hand, as shown in FIG. 10, the reflection-type diffraction grating is capable of using only a space on one side of the substrate. From this reason, when an actual optical system is composed of a reflection-type diffraction grating, downsizing of the system is limited by geometric interference of its optical elements or its mounts. From the viewpoint of achieving downsizing of the pulse width conversion device according to the present invention as well, it is more effective to use a transmission-type diffraction grating. Moreover, by using the characteristic that a transmission-type diffraction grating made of quartz glass has a high damage threshold, it is possible to reduce a cross section of a laser beam to be incident on the pulse width converter. Therefore, it is possible to select a compact optical element, which makes it possible to further pursue downsizing of the system.

The pulse width conversion device and the optical amplifier system according to the present invention are not limited to the above-described embodiments and the configuration examples, and various modifications thereof are possible.

The pulse width conversion device according to the above-described embodiment, which generates an output light pulse having a pulse width different from a pulse width of an input light pulse, the pulse width conversion device includes: (1) a spectroscopic element that disperses the input light pulse, input along a first optical path, to output the light rays at output angles according to their wavelengths along a second optical path, outputs a beam of light rays, input at incident angles according to their wavelengths along a third optical path, at a constant output angle along a fourth optical path, outputs the beam of light rays, input at a constant incident angle along a fifth optical path, at output angles according to their wavelengths along a sixth optical path, and couples the beam of light rays, input at incident angles according to their wavelengths along a seventh optical path, to output it as the output light pulse along an eighth optical path, (2) a first optical system that allows the beam of light rays, output at the output angles according to their wavelengths along the second optical path from the spectroscopic element, to be input at the incident angles according to their wavelengths along the third optical path to the spectroscopic element, (3) a second optical system that allows the beam of light rays, output at the constant output angle along the fourth optical path from the spectroscopic element, to be input at the constant incident angle along the fifth optical path to the spectroscopic element, and (4) a third optical system that allows the beam of light rays, output at the output angles according to their wavelengths along the sixth optical path from the spectroscopic element, to be input at the incident angles according to their wavelengths along the seventh optical path to the spectroscopic element.

Moreover, in the pulse width conversion device according to the above-described embodiment, regarding input-output directions of the beams of light rays for the spectroscopic element, the input-output direction in the combination of the third optical path and the fourth optical path is different from the input-output direction in the combination of the first optical path and the second optical path.

In the pulse width conversion device with the above-described configuration, the spectroscopic element is preferably a transmission-type diffraction grating. Further, the spectroscopic element is also preferably a reflection-type diffraction grating.

In the pulse width conversion device with the above-described configuration, the first optical system and the third optical system are preferably integrated. Further, the spectroscopic element, the first optical system, and the third optical system are preferably integrated. Furthermore, the spectroscopic element, the first optical system, the second optical system, and the third optical system are preferably integrated.

In the pulse width conversion device with the above-described configuration, both or one of the first optical system and the third optical system preferably include an optical path length adjusting section that adjusts an optical path length from light output from the spectroscopic element to light input to the spectroscopic element.

In the pulse width conversion device with the above-described configuration, in the second optical system, the incident angle when the beam of light rays is input along the fifth optical path to the spectroscopic element is preferably equivalent to the output angle when the beam of light rays is output along the fourth optical path from the spectroscopic element.

The optical amplifier system according to the above-described embodiment includes: (1) an optical amplifier device that optically amplifies a light pulse, and (2) the pulse width conversion device having the above-described configuration, to which the light pulse optically amplified by the optical amplifier device is input, and which compensates for dispersion of the input light pulse to output the light pulse.

INDUSTRIAL APPLICABILITY

The present invention is available as a pulse width conversion device which is easily downsized, and an optical amplifier system including such a pulse width conversion device, which is easily downsized.

REFERENCE SIGNS LIST 1, 1A to 1G, 2A to 2D—pulse width conversion device, 3—optical amplifier system, 10—spectroscopic element, 11—first optical system, 12—second optical system, 13—third optical system, 20 to 24—transmission-type diffraction grating 30 to 34—reflection-type diffraction grating, 40—rectangular prism, 41 to 43—reflecting mirror, 44—rectangular prism, 45—movable stage, 46 to 48—functional block, 49—prism, 50—excitation LD, 51—LD light guiding fiber, 52—optical coupler, 53—Yb-doped optical fiber, 54—collimating lens, 55—$\lambda/4$ plate, 56—$\lambda/2$ plate, 57—polarization beam splitter, 58—Faraday rotator, 59—$\lambda/2$ plate, 60—polarization beam splitter, 61—reflecting mirror, 62—$\lambda/4$ plate, 63—condensing lens, 64—single-mode optical fiber, $P_1$—first optical path, $P_2$—second optical path, $P_3$—third optical path, $P_4$—fourth optical path, $P_5$—fifth optical path, $P_6$—sixth optical path, $P_7$—seventh optical path, $P_8$—eighth optical path, Pi—input light pulse, Po—output light pulse.

The invention claimed is:

1. A pulse width conversion device which produces an output light pulse with a pulse width different from a pulse width of an input light pulse, the pulse width conversion device comprising:
 a spectroscopic element dispersing the input light pulse, input along a first optical path, to output the light rays at output angles according to their wavelengths along a second optical path, outputting a beam of light rays, input at incident angles according to their wavelengths along a third optical path, at a constant output angle along a fourth optical path, outputting the beam of light rays, input at a constant incident angle along a fifth optical path, at output angles according to their wavelengths along a sixth optical path, and coupling the beam of light rays, input at incident angles according to their wavelengths along a seventh optical path, to output it as the output light pulse along an eighth optical path;
 a first optical system configured such that the light rays, output at the output angles according to their wavelengths along the second optical path from the spectroscopic element, pass through the first optical system to be input at the incident angles according to their wavelengths along the third optical path to the spectroscopic element, and the light rays are then output at the constant output angle along the fourth optical path from the spectroscopic element;
 a second optical system configured such that the light rays, output at the constant output angle along the fourth optical path from the spectroscopic element, pass through the second optical system to be input at the constant incident angle along the fifth optical path to the spectroscopic element, and the light rays are then output at the output angles according to their wavelengths along the sixth optical path from the spectroscopic element; and
 a third optical system configured such that the light rays, output at the output angles according to their wavelengths along the sixth optical path from the spectroscopic element, pass through the third optical system to be input at the incident angles according to their wavelengths along the seventh optical path to the spectroscopic element, and the light rays are then coupled by the spectroscopic element to be output as the output light pulse along the eighth optical path from the spectroscopic element, wherein,
 regarding input-output directions of the beams of light rays at the spectroscopic element, the input-output direction in the combination of the third optical path and the fourth optical path is different from the input-output direction in the combination of the first optical path and the second optical path.

2. The pulse width conversion device according to claim 1, wherein the spectroscopic element is a transmission-type diffraction grating.

3. The pulse width conversion device according to claim 1, wherein the spectroscopic element is a reflection-type diffraction grating.

4. The pulse width conversion device according to claim 1, wherein the first optical system and the third optical system are integrated.

5. The pulse width conversion device according to claim 1, wherein the spectroscopic element, the first optical system, and the third optical system are integrated.

6. The pulse width conversion device according to claim 1, wherein the spectroscopic element, the first optical system, the second optical system, and the third optical system are integrated.

7. The pulse width conversion device according to claim 1, wherein both or one of the first optical system and the third optical system include an optical path length adjusting section for adjusting an optical path length from light output from the spectroscopic element to light input to the spectroscopic element.

8. The pulse width conversion device according to claim 1, wherein, in the second optical system, the incident angle when the beam of light rays is input along the fifth optical path to the spectroscopic element is equivalent to the output angle when the beam of light rays is output along the fourth optical path from the spectroscopic element.

9. An optical amplifier system comprising:
 an optical amplifier device optically amplifying a light pulse, and
 the pulse width conversion device according to claim 1, to which the light pulse optically amplified by the optical amplifier device is input, and which compensates for dispersion of the input light pulse to output the light pulse.

* * * * *